United States Patent
Jobson et al.

(10) Patent No.: US 7,976,970 B2
(45) Date of Patent: Jul. 12, 2011

(54) FUEL CELL UNIT AND FUEL CELL DEVICE COMPRISING A NUMBER OF SAID FUEL CELL UNITS

(75) Inventors: Edward Jobson, Romelanda (SE); Staffan Lundgren, Hindås (SE)

(73) Assignees: Volvo Teknisk Utveckling AB; Volvo Personvagnar AB

( * ) Notice: Subject to any disclaimer, the term of this patent is extended or adjusted under 35 U.S.C. 154(b) by 2302 days.

(21) Appl. No.: 10/249,162

(22) Filed: Mar. 19, 2003

(65) Prior Publication Data

US 2003/0198856 A1   Oct. 23, 2003

Related U.S. Application Data

(63) Continuation of application No. PCT/SE01/01940, filed on Sep. 12, 2001, now abandoned.

(30) Foreign Application Priority Data

Sep. 19, 2000   (SE) ...................................... 0003325

(51) Int. Cl.
*H01M 8/04*   (2006.01)
(52) U.S. Cl. ......................................................... 429/34
(58) Field of Classification Search ............... 429/30–32, 429/34
See application file for complete search history.

(56) References Cited

U.S. PATENT DOCUMENTS

| 4,499,663 | A  |   | 2/1985  | Zwick et al. |
|-----------|----|---|---------|--------------|
| 4,857,420 | A  | * | 8/1989  | Maricle et al. ................... 429/30 |
| 5,034,023 | A  | * | 7/1991  | Thompson .................... 205/634 |
| 5,162,167 | A  | * | 11/1992 | Minh et al. ....................... 429/30 |
| 5,770,326 | A  | * | 6/1998  | Limaye ........................... 429/30 |
| 6,025,084 | A  | * | 2/2000  | Kawasaki et al. ............... 429/30 |
| 6,423,436 | B1 | * | 7/2002  | George et al. ................... 429/31 |

FOREIGN PATENT DOCUMENTS

EP   0442741 A1   8/1991

* cited by examiner

*Primary Examiner* — Mark Ruthkosky

(57) ABSTRACT

Method and apparatus for establishing a fuel cell unit (10) in the form of an extruded monolith having channels (14), of which every second constitutes a fuel channel (14a) and every other second an oxygen channel (14b). The channels (14) are designed in such a manner that the fuel channels (14a) are displaced laterally in relation to the oxygen channels (14b), in such a way that all the fuel channels (14a) protrude a certain distance from the end points of all the oxygen channels 14b) and all the oxygen channels (14b) protrude a certain distance from the end points of all the fuel channels (14a). The distance is less than the length of respective channels. The invention also relates to a fuel cell device that includes several of the fuel cell units (10) that together establish an enhanced system of fuel cell units that lend themselves to compact.

7 Claims, 5 Drawing Sheets

FUEL CELL UNIT AND FUEL CELL DEVICE COMPRISING A NUMBER OF SAID FUEL CELL UNITS

CROSS REFERENCE TO RELATED APPLICATIONS

This application is a continuation patent application of International Application No. PCT/SE01/01940 filed 12 Sep. 2001 which was published in English pursuant to Article 21(2) of the Patent Cooperation Treaty, and which claims priority to Swedish Application No. 0003325-8 filed 19 Sep. 2000. Both applications are expressly incorporated herein by reference in their entireties.

BACKGROUND OF INVENTION

1. Technical Field

The present invention relates to a fuel cell unit in the form of an extruded monolith comprising channels of which every second constitutes a fuel channel and every other second an oxygen channel. The invention also relates to a fuel cell device comprising (including) several such fuel cell units. In particular, the invention is applied in connection with packing of fuel cell units to a larger system of fuel cell units; for example, a fuel cell device to be used as a power source in a vehicle.

2. Background Art

In the pursuit of environmentally enhanced power sources, for example with respect to propulsion systems for vehicles, fuel cells have been the subject to extensive research. There are many types of fuel cells that use different types of fuel for different purposes. The production of electricity, however, is a common feature of substantially all fuel cells.

All fuel cells are constructed in a layer structure comprising a fuel side, an oxygen side, a membrane and two electrically conducting plates in the form of an anode and a cathode. The membrane is an electrical insulator at the same time as it works as an electrolyte that admits ionic conduction between the anode and the cathode, which are placed on each side of the membrane. The fuel side is normally placed at the anode side and the oxygen side is normally placed at the cathode side. For most fuel cells, the anode, the cathode, and the electrodes consist of a porous carbon material that is coated with a catalyst material such as platinum (Pt). The catalyst material catalyses a reduction of the fuel at the anode side by means of a reduction of electrons and catalyses an oxidation of the oxygen at the cathode side by means of a supply of electrons. These two reactions cause an electron migration, that is, an electrical current from the anode side to the cathode side via an electrode connection. The ionized particles from either the anode side or the cathode side diffuses through the membrane and reacts on the opposing side by forming some kind of compound, for example water. If there is hydrogen on the fuel side and the membrane allows ionized hydrogen to diffuse, the process and arrangement may be referred to as "Proton Exchange Membranes" (PEM). If the membrane allows ionized oxygen to diffuse from the cathode side, reference may be made to "Oxide Fuel Cells" (OFC).

In a structure of a type referred to as "Solid Oxide Fuel Cell" (SOFC), a ceramic solid phase membrane (electrolyte) is utilized. A suitable material that is used is "dense yttrium stabilized zirconium dioxide," which is an excellent conductor for negatively charged oxygen ions at high temperatures around 1830 degrees F. (1000 degrees C.). At such a temperature, it is possible to have an inner reforming of carboniferous fuels.

When using a fuel cell, it is necessary to consider a number of parameters such as weight, volume, degree of efficiency, working temperature, material, fuel, exhausts and the like depending upon within which field of usage the fuel cell shall be used.

In order to satisfy the power need of a larger unit such as a vehicle, more fuel cells are needed. A way to solve the problem with the mounting of the many fuel cells is to extrude a fuel cell unit in the form of a monolith with a substantially honeycomb structure comprising (that includes) a number of fuel cells which thus form a larger, more compact fuel cell. In some cases, a single monolith with a honeycomb structure will not be able to be made large enough to supply sufficient electricity to power such a larger device as an automobile or other type of vehicle due to manufacturing reasons. This can mean that a mounting of several fuel cell units in the form of monoliths with a honeycomb structure is therefore made necessary.

It is previously known to extrude an SFOC fuel cell unit in the form of a monolith with a honeycomb structure in a material of yttrium stabilized zirconium dioxide which constitutes a membrane that conducts ions, but is not electrically conductive. The fuel cell unit then consists of square/rectangular channels defined by extruded walls of yttrium stabilized zirconium dioxide which form rows of fuel conduit channels with a square/rectangular cross-section with a pole of a conducting catalyzing material on the inside of the channel, and rows of oxygen conduit channels with a square/rectangular cross-section with a pole of a conducting catalyzing material on the inside of the channel. The rows of channels are placed in such a way that every second row is a fuel conduit channel and every other second row is an oxygen conduit channel. The fuel conduit channels and the oxygen conduit channels are of equal lengths and sizes, why every short side of the monolithic fuel cell unit is covered by a covering plate with a system of channels that is designed to conduct the fuel and the oxygen, respectively, to the correct row, i.e. to the correct channel. The monolithic fuel cell unit may be connected to other similar fuel cell units, thus acquiring a compact system of fuel cell units with desired power, by designing a larger covering plate to cover the short side of the system of monolithic fuel cell units that have been connected and where the covering plate has been equipped with a system of channels which supplies the fuel channels and the oxygen channels with the correct fluid; respectively, the fuel and oxygen.

Even if previously known systems function well, enhancements may be made concerning acquiring a more compact system of fuel cell units (fuel cell device). According to previously known technology, the covering lid that covers the short side of the fuel cell device is designed with specially adapted channels that shall fit the fuel, oxygen and exhaust channels. For the fuel cell device to function properly, high demands are made upon the fitting and tightness between the covering plate with its channels and the shaped rows of channels in the fuel cell units. The manufacture of such a plate may be expensive, and the special demands make the device quite inflexible. Even if separate bottom-plates were used for the separate extruded fuel cell units, an adaptation should be necessary for the connections that are needed between the different bottom plates, if several such fuel cell units are connected to a fuel cell device.

Further disadvantages with previously known technology is that the channels which are formed in the covering plate cause a quite high fall-off pressure, which reduces the degree of efficiency of the system and makes the distribution of air and fuel more difficult.

If a system of fuel cell units shall be commercially practicable, it is required that the system have a small volume in relation to the amount of power that is produced. It is also necessary that the system be simple to manufacture and inexpensive to manufacture.

SUMMARY OF INVENTION

One objective of the present invention is to eliminate the problems that have been identified above that are associated with previously known technology and thus satisfy the desires or requirements stated for enhanced systems of fuel cell units (a fuel cell device).

The objectives stated above are obtained by way of a fuel cell unit in the form of an extruded monolith that has channels in which every second constitutes a fuel channel and every other second an oxygen channel. The invention is characterized in that the channels are designed in such a manner that the fuel channels are displaced laterally in relation to the oxygen channels in such a way that all the fuel channels protrude a certain distance from the end points of all the oxygen channels, while all the oxygen channels protrude a certain distance from the end points of all the fuel channels and this distance is less than the length of respective channels.

The objectives mentioned above are also obtained by means of a device in which several fuel cell units are packed to (packaged or connected to) a fuel cell device in which the fuel cell units are mounted in such a way that the fuel channels in a first fuel cell unit are in direct connection with the fuel channels in a second fuel cell unit, and in such a way that the oxygen channels in a first fuel cell unit are in direct connection with the oxygen channels in an adjacent fuel cell unit. The packing may be made in one, two or three dimensions.

With the device described above, a more simple and less expensive fuel cell device is provided that is more compact and occupies less volume per delivered amount of power than previously known devices.

BRIEF DESCRIPTION OF DRAWINGS

The invention will be described in the following text, in connection with preferred embodiments and the enclosed drawings, where.

DETAILED DESCRIPTION

Figure 1:
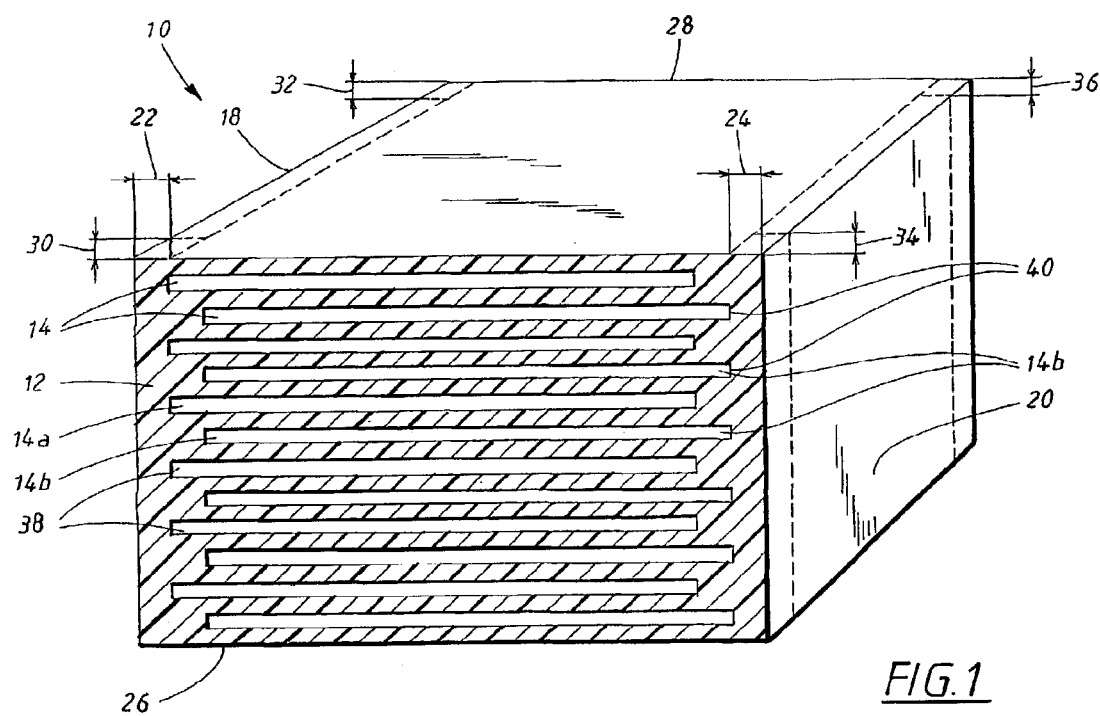
FIG. 1 shows a perspective view of a cross-section of a fuel cell unit configured according to one embodiment of the present invention before edge parts or portions have been cut off, and where one of the open sides has not been plugged; that is, made gas-tight.

In the drawings, those features that recur in different figures are indicated with the same reference numbers. FIGS. 1, 2, 3 and 4 show perspective views of a cross-section of a fuel cell unit 10 configured according to one embodiment of the present invention. The cross-section is taken along one of the open, but not plugged, sides of the fuel cell unit 10. By the terminology "plugged," it should be appreciated that it is meant that the open sides of the fuel channels are sealed with a suitable material in a suitable manner in order to acquire more or less gas-tight sides. The fuel cell unit 10 consists of an extruded monolith designed with a lamellar structure where the ion conductive material 12 defines channels 14 with a rectangular cross-section, the inner walls of which are coated with a layer (washcoat) of an electrically conductive material 16, such as Peroskviter with a high conductivity. The channels 14 are divided into fuel channels 14a and oxygen channels 14b. The inner walls of the fuel channels 14a are coated with a first electrically conductive material 16a (especially shown in FIG. 3) and those of the oxygen channels 14b are coated with a second electrically conductive material 16b (especially shown in FIG. 3). The fuel channels 14a and oxygen channels 14b of the fuel cell unit 10 are designed in such a way that every second channel is a fuel channel 14a and every other second channel is an oxygen channel 14b. Further, the channels 14 are essentially of equal length.

The invention finds at least partial basis in the fact that the channels 14 are displaced laterally in relation to each other in such a way that all the fuel channels 14a, facing a first side 18, protrude a certain distance from the end points of all the oxygen channels 14b, while all the oxygen channels 14b, facing a second side 20, protrude a certain distance from the end points of all the fuel channels 14b. According to the invention, this distance is less than the length of the respective channels and the sides 18, 20 mainly constitute parallel side pieces. On the sides 18, 20, a first edge part 22 and a second edge part 24 is formed, respectively, and the width of which is determined of how long the channels 14 are, and the magnitude of the displacement between the channels 14. The channels extend in depth from a third side 26 to a fourth side 28, which has an extension that is mainly perpendicular to the first side 18 and the second side 20. In the figures, a third part 30 is marked, which constitutes a predetermined distance along the first side 18, from the edge between the first side 18 and the third side 26. In the figures, a fourth part 32, a fifth part 34 and a sixth part 36 are also marked that constitute corresponding distances on respective corner parts.

FIG. 1 shows perspective view of a cross-section of the fuel cell unit before the edge parts have been cut off, and where one of the open sides, more precisely the third side 26, has not been plugged.

Figure 2:
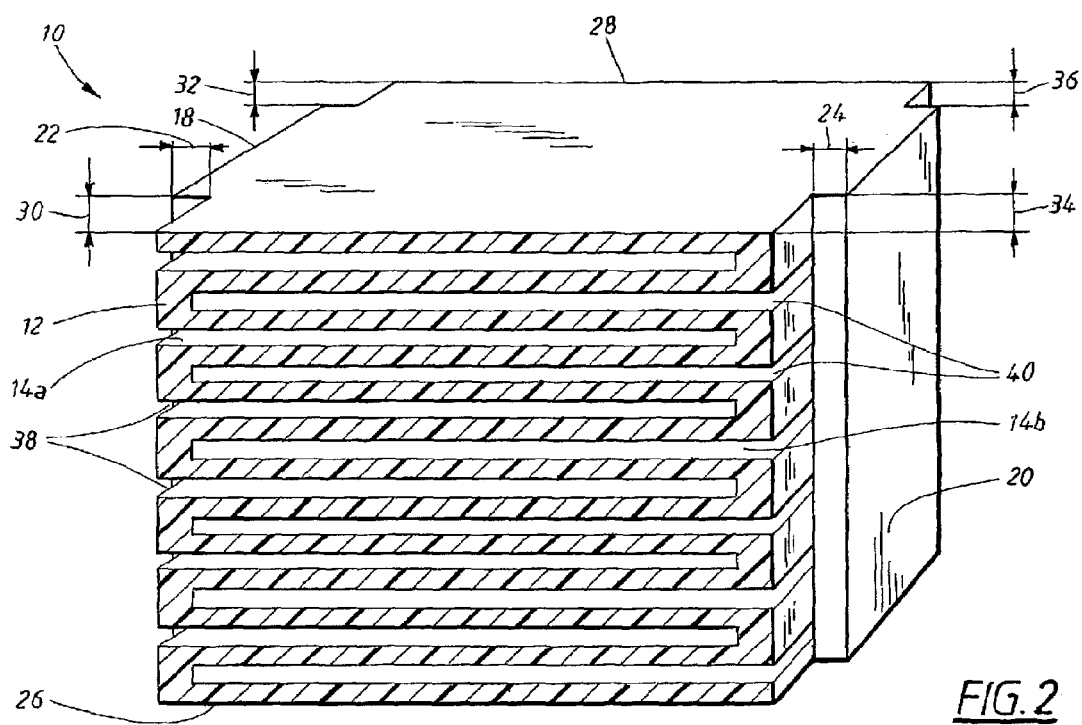
FIG. 2 shows a perspective view of a cross-section of the fuel cell unit according to FIG. 1, but with the edge parts cut off, and where one of the open sides has not been plugged.

FIG. 2 shows an outlined drawing of a fuel cell unit 10 configured according to this same embodiment of the invention where the first edge part 22 has been cut off in the level of the end parts 38 of the fuel channels 14a on the first side 18 in such a way that the protruding end parts 38 of all the fuel channels 14a have been exposed during a distance that consists of the third part 30 and the fourth part 32, respectively. The terminology "end part" refers to the part of the channel where the channel ends sideways and the material in the edge parts follows. In the same manner, the other edge part 24 has been cut off in the level of the end parts 40 of the oxygen channels 14b at the other side 20, in such a way that the protruding end parts 40 of all the oxygen channels 14b have been exposed during a distance that consists of the fifth part 34 and the sixth part, respectively. The figure shows the third side 26 without a plug.

Figure 3:
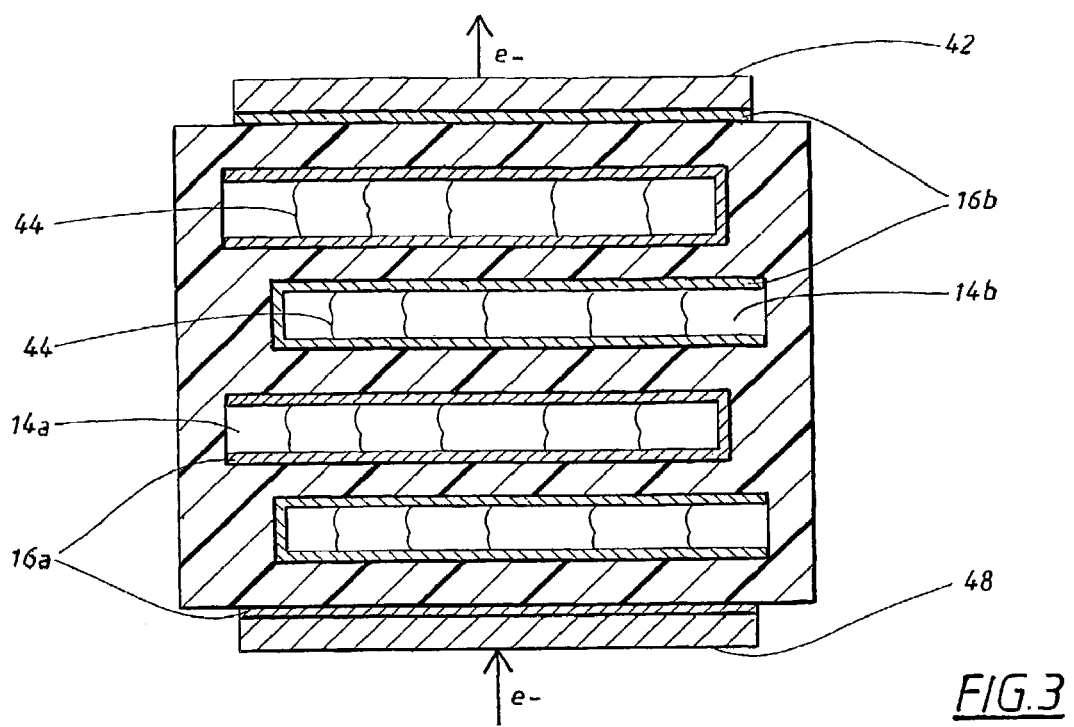
FIG. 3 shows a perspective view of a cross-section of the fuel cell unit according to FIG. 1 illustrating the channels in the unit and a first placement of an electrode connection.

FIG. 3 shows a similar view of a cross-section of the channels in a fuel cell unit with a first placement of electrode connections according to the above-described embodiment of the invention. A first electrode connection 42 is brought on the outer side of the first electrically conductive material 16a, which also coats the upper outer side of the extruded fuel cell unit 10. A second electrode connection 48 is brought on the outer side of the second electrically conductive material 16b which also coats the lower outer side of the extruded fuel cell unit 10. The electrode connections have connection points made in a material with high conductivity such as platinum. In order to locally avoid too high electrical currents in the electrically conductive materials 16a, 16b in the channels 14a, 14b, the washcoat of the electrically conductive material is deliberately made uneven at the manufacture of the fuel cell unit. This results in electrically conductive connection points 44 between the electrically conductive materials 16a, 16b in respective fuel channels 14a and oxygen channels 14b. The electrically conductive connection points 44 thus short-circuit the layers of electrically conductive material and thus distributes the current over the surfaces of the channels walls.

Another alternative is to apply electrode connections on a fuel cell unit 10 like that of the first embodiment of the invention and in which the exposed protruding end parts 38 of fuel channels 14a are partly coated by a first electrode connection. This first electrode connection is fastened on the extruded material with an electrically conductive adhesive via a layer of a third electrically conductive material that is connected to the first conductive material 16a in the fuel channels 14a. The exposed protruding end parts 40 of the oxygen channels 14b are partly coated by a second electrode connection that is fastened on the extruded material with an electrically conductive adhesive, via a layer of a fourth electrically conductive material.

Figure 4:
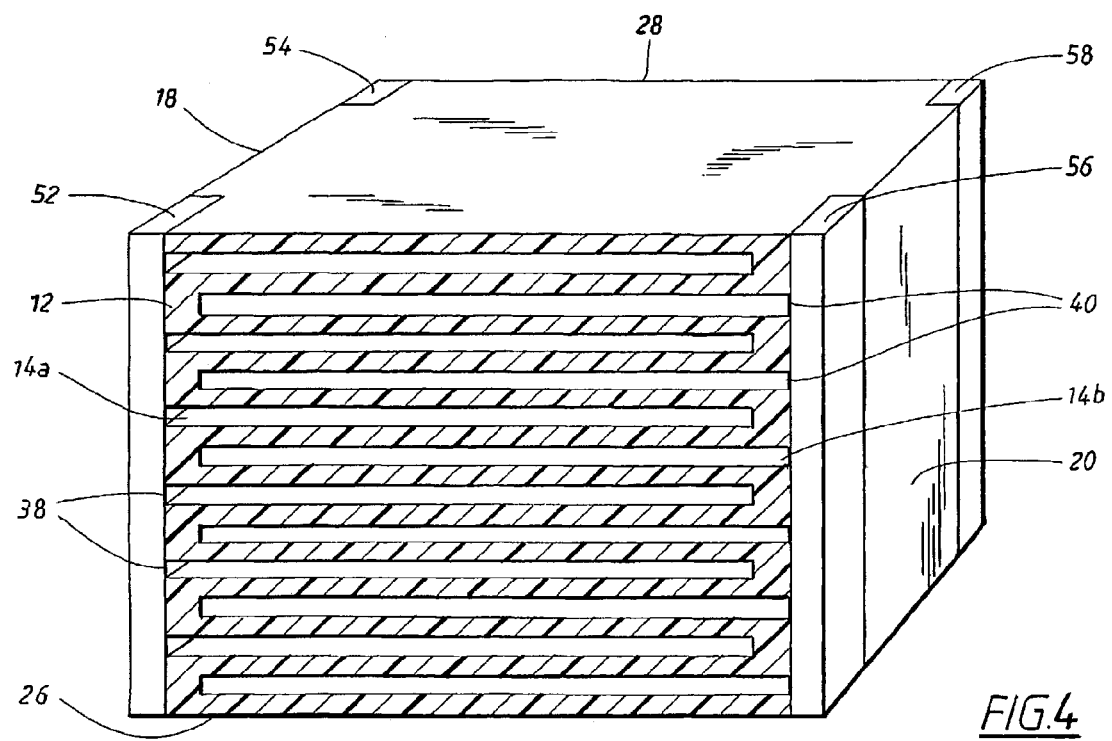
FIG. 4 shows a perspective view of a cross-section of the fuel cell unit according to FIG. 1 illustrating the mounting of the fuel and exhaust connections, where one of the open sides has not been plugged.

FIG. 4 shows a fuel cell unit 10 that is configured according to the present invention and in which a first connection 52 is connected to the first side 18 in the level of the third side 26. A second connection 54 is connected to the first side 18 in the level of the fourth side 28, a third connection 56 is connected to the second side 20 in the level of the third side 26 and a fourth connection 58 is connected to the second side 20 in the level of the fourth side 28. The figure shows the third side 26 without a plug.

Figure 5:
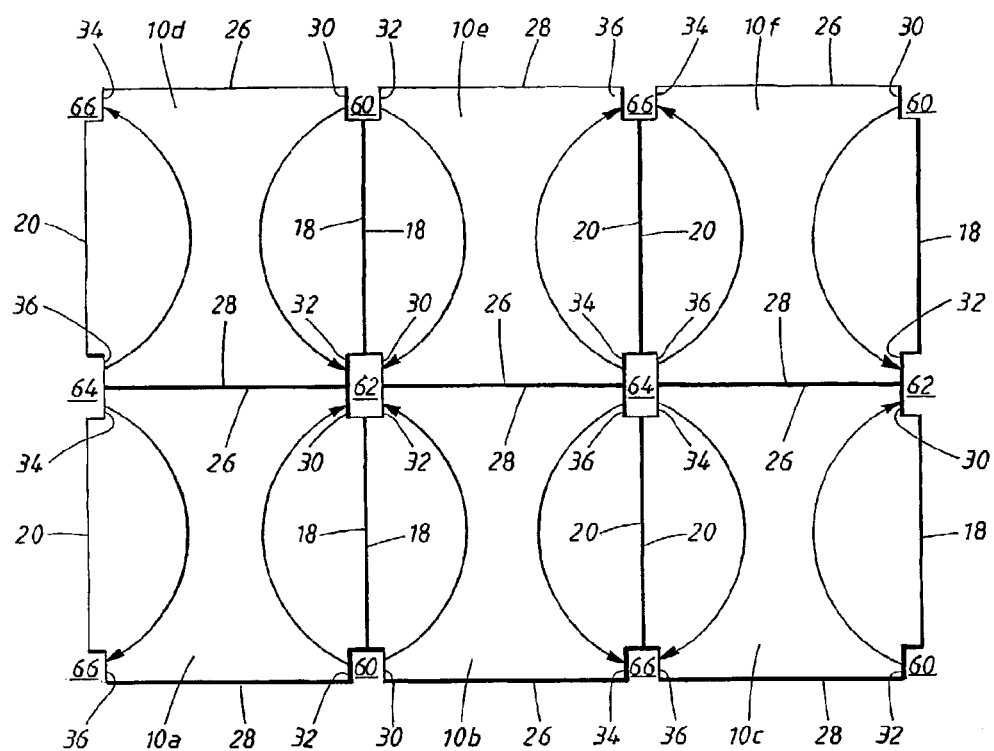
FIG. 5 shows an essentially top plan view of a three-dimensional packing of a number of fuel cell units into the form of a fuel cell device with plugged sides.

FIG. 5 shows a top plan view of a three-dimensional packing of a fuel cell device that in turn comprises (includes) several fuel cell units 10a, 10b, 10c, 10d, 10e, 10f of the kind(s) described above. In the instant invention, "three-dimensional packing" refers to the fact that the fuel cell units 10a, 10b, 10c, 10d, 10e, 10f are piled in three dimensions. The connections 52, 54, 56, 58 shown in FIG. 4 are removed. The indicated fuel cell units 10a, 10b, 10c, 10d, 10e, 10f each correspond to the previously mentioned fuel cell unit 10 (see FIGS. 1–4) and the reference numbers are solely intended to facilitate the understanding of the three-dimensional device and the packing procedure, respectively. The open third 26 and fourth 28 sides of all the fuel cell units shown in FIGS. 1–4 are shown without a plug.

The fuel cell units 10 are mounted in such a way that that the fuel channels 14a in a first fuel cell unit 10a are in a direct connection with the fuel channels 14a in a second fuel cell unit 10b, and also in such a way that the oxygen channels 14b in a first fuel cell unit 10a are in a direct connection with the oxygen channels 14b in an adjacent fuel cell unit.

An important principle upon which the invention is based is that the fuel cell units 10a, 10b, 10c are mounted in a first row, one dimension, with the first side 18 of a first fuel cell unit 10a placed towards the first side 18 of a second fuel cell unit 10b in such a way that the exposed end parts 38 of the fuel channels 14a of the different fuel cell units 10a, 10b and the space that is constituted by the removed first edge parts 22 of the fuel channels 14a with the length of the third parts 30 and fourth parts 32, respectively, of the fuel cell units 10a, 10b, forms first fuel conduit channels 60 and second fuel conduit channels 62. In a similar way, the second side 20 of the second fuel cell unit 10b is placed towards the second side 20 of a third fuel cell unit 10c, resulting in that the space that is constituted by the removed second edge parts 24 of the oxygen channels 14b with the length of the fifth parts 34 and sixth parts 36, respectively, of the fuel cell units 10a, 10b, forms first oxygen conduit channels 64 and second oxygen conduit channels 66. A packing pattern for one row, one dimension, has thus been formed by always turning the first side 18 of a fuel cell unit 10 towards the first side 18 of another fuel cell unit, and by always turning the second-side 20 of a fuel cell unit 10 towards the second side 20 of a fuel cell unit 10.

The packing pattern formed in the first row is repeated in a second row where the fuel cell units 10d, 10e, 10f correspond to the fuel cell units 10a, 10b, 10c mentioned above. The first row is then placed next to the second row, forming a packing pattern in a plane, i.e. two dimensions, in such a way that the third sides 26 and fourth sides 28 of the fuel cell units 10a, 10b, 10c are placed towards the third sides 26 and fourth sides 28 of the fuel cell units 10d, 10e, 10f. The space that is constituted by the removed first edge parts 22 of the fuel channels 14a with the length of the third parts 30 and fourth parts 32, respectively, of the fuel cell units 10a, 10b, forms first fuel conduit channels 60 and second fuel conduit channels 62. The space that is constituted by the removed second edge parts 24 of the oxygen channels 14b with the length of the fifth parts 34 and sixth parts 36, respectively, of the fuel cell units 10a, 10b, forms first oxygen conduit channels 64 and second oxygen conduit channels 66, which results in a possibility for a common air supply for the oxygen conduit channels 64, 66, and a common fuel supply for the fuel conduit channels 60, 62 for all the fuel cell units 10 in the assembled fuel cell device after which the packing pattern may be repeated both longitudinally and transversely. In order to pack the fuel cell units 10 vertically, the pattern from a lower layer is repeated in a new layer, where the new layer is put on the lower layer in such a way that the fuel conduit channels 60, 62 and the oxygen conduit channels 64, 66, respectively, are matched together.

One of the advantages with plugging the third side 26 and the fourth side 28, respectively, is that after the corners are cut off, it becomes less delicate to adapt the many fuel cell units 10 to create the fuel conduit channels 60, 62 and the oxygen conduit channels 64, 66, respectively, of a fuel cell device. That is, the adaptation of the different fuel cell units 10 vertically and laterally in relation to each other becomes less delicate. During packing according to what has been described above, the sides of the different fuel cell units 10 may also be "glued" together. This may be accomplished, for example, by using ceramics and thus creating a gas-tight seal that establishes the fuel conduit channels 60, 62 and the oxygen conduit channels 64, 66 as being gas-tight. The packing also reduces the degree of delicacy of the so-adapted fuel cell units 10 that may have different symmetries.

Depending on how the fuel conduit channels 60, 62 and the oxygen conduit channels 64, 66, respectively, are used, either a downstream flow or an upstream flow, flows in relation to each other, may be acquired through the fuel cell units 10 of the fuel cell device. Of course, this also applies when one only has one fuel cell unit with connections according to FIG. 4 where the flow is determined in dependence of the choice of connection. In an arrangement with a two- or three-dimensional packing, the fuel conduit channels 60, 62 constitute a fuel conduit channel and an exhaust conduit channel, respectively. The oxygen conduit channels 64, 66 constitute an oxygen conduit channel and an exhaust conduit channel, respectively, depending on the choice of downstream or upstream flow through the fuel cell units 10.

The indications in FIG. 5 and the following example are referred to for the purpose of illustrating the opportunities afforded by fuel cell devices configured as described hereinabove. The fuel conduit channels 60, 62 are aligned in a row, one after the other, as are the oxygen conduit channels 64, 66. If the second fuel conduit channel 62 and the second oxygen conduit channel 66 are chosen to constitute exhaust channels, every second conduit channel of the fuel cell device is an oxygen or a fuel channel, and every other second an exhaust channel. The second fuel conduit channel 62 and the second oxygen conduit channel 66 which constitute exhaust channels may be plugged at, for example, the upper side which results in that all exhausts have their outlet at one side, here the lower side, which results in the advantage that only one exhaust pipe has to be applied to the fuel cell device. The exhaust pipe may then consist of a standard exhaust pipe made in metal, with or without a manifold. By means of the arrangement mentioned above, the upper side of the fuel cell device constitutes a fuel/oxygen side and the lower side constitutes an exhaust side. Since the oxygen channels 64 are placed in a row, and the fuel channels 60 are placed in a row, it is easy to arrange the supply of the two gases by way of, for example, arranging a channel that runs across all the inputs to the fuel channels and which constitutes a common fuel supply, and by arranging a channel that runs across all the inputs to the oxygen channels and which constitutes a common oxygen supply. Another alternative may be to arrange a specially designed plate that covers all of the upper side, which plate includes channels that constitute fuel and oxygen conduit channels, respectively.

When extrusion-manufactured, the fuel cell unit 10 is made in the form of a rectangular parallelepiped where the two sides that constitute cross-sections of the channels are open. When using the fuel cell unit 10, these sides are plugged with a suitable material, after which the edge parts 22, 24 of the fuel cell unit are cut off in accordance with the invention. The machined block is thereafter put in a gas-tight reactor.

An approximate measure of the desired power amount required to propel a vehicle is approximately 80 kW. A typical fuel cell produces approximately 0.9 V and occupies an approximate volume of 12.5 liters (0.5 cubic feet). The required number of cells to produce 80 kW include on the order of 457 pieces. For reasons of strength, a fuel cell unit consists of approximately 98 cells/fuel cell unit, which results in that approximately 5 fuel cell units are needed in order to obtain a power of 80 kW. When making calculations for a fuel cell device producing 80 kW at approximately 800 degrees C. (1470 degrees F.) and constructed of extruded yttrium stabilized zirconium dioxide with a wall thickness of approximately 150 um, a desired area of 22.8 m$^2$ (245 ft$^2$) is obtained. Then, suitable dimensions for such a fuel cell device with the volume 12.5 L in order to produce 80 kW are approximately 0.005 m×1 m×0.25 m (0.02 ft×3.3 ft×0.8 ft). Suitable wall thickness of extruded yttrium stabilized zirconium dioxide in respective fuel cell unit 10 is approximately 50 150 um. The calculations above are based on results obtained experimentally, and shall only be regarded as a descriptive example.

The fuel cell unit 10 according to the invention is exemplarily of an (SOFC) that admits fuel types which are oxidized by oxygen at 500–1000 degrees C. (930–1830 degrees F.); for example, gasoline, diesel, natural gas, hydrogen, biogas, rapeseed oil, ethanol, methanol and others.

Air and the chosen fuel are supplied to the fuel cell unit 10, which after reaction forms an exhaust product containing mainly $CO_2$ and water, but also smaller amounts of non-combusted fuel and other waste products may be acquired. One of the advantages with the invention is that one may choose if the flows of air and fuel shall run upstream or downstream. An upstream flow provides an optimum combustion as there is excess oxygen where the share of fuel in relation to the exhaust products is minimal. This results in the share of non-combusted components, as well as the share of other waste products in the exhaust product being very low. The reactions take place at approximately 800 degrees C. (1470 degrees F.) and provides an exhaust product at approximately 1000 degrees C. (1830 degrees F.).

One of the advantages with the fuel cell unit being able to run at such a high temperature is that the waste heat from the fuel cell unit may be used for heating the exhausts that run a turbo unit instead of being wasted to the environment. This results in an increased degree of efficiency for the device. The turbo unit may be configured in the format of a "Sterling or Ranking cycle". The turbo unit's compressor compresses the air in to the fuel cell to 2–3 bar. At reaction temperatures exceeding 400 degrees C. (752 degrees F.), an amount of power exceeding the amount of power that is needed for compressing the gas is acquired, which excess amount of power may be used to run a conventional generator which increases the degree of efficiency for the device. If the generator is run "backwards" as an engine, it may be used for starting the device.

The invention is not limited to what has been exemplarily described above, but different embodiments are possible within the scope of the claims. The fuel cell unit and the fuel cell device may also be used for other purposes than for propulsion of vehicles; for example, they may be used for producing electrical power at stationary establishments.

The invention claimed is:

1. A fuel cell unit comprising:
    an extruded monolith having a plurality of channels of which every second channel establishes a fuel channel with a direction of flow mainly in a depth direction and every other second channel establishes an oxygen channel with a direction of flow mainly in the depth direction;
    the plurality of channels being configured so that the fuel channels are displaced laterally, in a direction essentially perpendicular to the depth direction, in relation to the oxygen channels so that the fuel channels protrude a certain distance from end point parts of the oxygen channels;
    the oxygen channels protrude a certain distance from end point parts of the fuel channels that is less than a length of respective channels;
    the protruding end point parts of the fuel channels are exposed along a predetermined distance; and
    the protruding end point parts of the oxygen channels are exposed along a predetermined distance.

2. The fuel cell unit as recited in claim 1, further comprising:
    the fuel channels being coated with a first electrically conductive material and the oxygen channels being coated with a second electrically conductive material.

3. The fuel cell unit as recited in claim 1, further comprising:
    the plurality of channels consist of an oxygen ion conductive material.

4. A fuel cell device comprising:
    a plurality of fuel cell units formed as an extruded monolith comprising a plurality of channels of which every second channel constitutes a fuel channel with a direction of flow mainly in a depth direction and every other second channel constitutes an oxygen channel with a direction of flow mainly in the depth direction;

the plurality of channels is designed in such a manner that the fuel channels are displaced laterally, in a direction essentially perpendicular to the depth direction, in relation to the oxygen channels in such a way that the fuel channels protrude a certain distance from end point parts of the oxygen channels and the oxygen channels protrude a certain distance from end point parts of the fuel channels;

the distance of protrusion is less than a length of the channels and protruding end point parts of the fuel channels are exposed along a predetermined distance and protruding end point parts of the oxygen channels are exposed along a predetermined distance; and the fuel cell units are mounted so that the fuel channels in a first fuel cell unit are in direct connection with the fuel channels in a second fuel cell unit and so that the oxygen channels in the first fuel cell unit are in direct connection with the oxygen channels in an adjacent fuel cell unit.

5. The fuel cell device as recited in claim 4, further comprising:

the plurality of fuel cell units are mounted in a first row with a first side of the first fuel cell unit placed towards a first side of a second fuel cell unit;

exposed end point parts of the fuel channels form first fuel conduit channels and second fuel conduit channels; and a second side of the second fuel cell unit is oriented towards a second side of a third fuel cell unit and arranged so that the exposed protruding end parts of the oxygen channels form first oxygen conduit channels and second oxygen conduit channels.

6. The fuel cell device as recited in claim 5, further comprising:

the plurality of fuel cell units being established by a three-dimensional packing of fuel cell units that includes a repeating of the packing pattern in a first row in further rows with further fuel cell units.

7. The fuel cell device as recited in claim 6, further comprising:

the plurality of fuel cell units being established by a packing of fuel cell units having a repeating pattern from a lower layer in a new layer, where the new layer is put on the lower layer in such a way that the fuel conduit channels and the oxygen conduit channels, respectively, are matched together vertically.

* * * * *